(12) United States Patent
Chaine

(10) Patent No.: US 8,896,429 B2
(45) Date of Patent: Nov. 25, 2014

(54) TACTILE MAN-MACHINE INTERFACE WITH DATA COMMUNICATION INTERFACE

(75) Inventor: Sebastien Chaine, Issy-les-Moulineaux (FR)

(73) Assignee: Elo Touch Solutions, Inc., Milpitas, CA (US)

( * ) Notice: Subject to any disclaimer, the term of this patent is extended or adjusted under 35 U.S.C. 154(b) by 574 days.

(21) Appl. No.: 13/122,405

(22) PCT Filed: Oct. 5, 2009

(86) PCT No.: PCT/EP2009/007108
§ 371 (c)(1),
(2), (4) Date: Jun. 9, 2011

(87) PCT Pub. No.: WO2010/040489
PCT Pub. Date: Apr. 15, 2010

(65) Prior Publication Data
US 2011/0234387 A1    Sep. 29, 2011

(30) Foreign Application Priority Data
Oct. 7, 2008   (EP) .................................... 08290946

(51) Int. Cl.
*G08B 6/00*  (2006.01)
*G06F 3/041*  (2006.01)
*G07F 19/00*  (2006.01)
*G07F 9/02*  (2006.01)

(52) U.S. Cl.
CPC ............. *G06F 3/0416* (2013.01); *G07F 19/205* (2013.01); *G07F 9/02* (2013.01); *G07F 19/20* (2013.01)
USPC ..................... 340/407.2; 340/407.1; 345/173; 345/177

(58) Field of Classification Search
CPC ....... G06F 3/0488; G06F 3/041; G06F 3/033; G06F 3/038; G06F 3/0418; G06F 3/043; G06F 3/0433; G06F 3/04883; G06F 3/0346; G06F 3/0386; G06F 3/0425; G06F 3/0481; G06F 3/04815; G06F 13/105; G06F 3/016; G06F 3/0202; G06F 3/0412; G06F 3/0414; G08B 6/00
USPC ............. 340/407.1, 407.2; 345/173, 177–178
See application file for complete search history.

(56) References Cited

U.S. PATENT DOCUMENTS 5,252,951 A * 10/1993 Tannenbaum et al. ......... 345/156
5,515,079 A *  5/1996 Hauck ............................ 345/157
(Continued)

FOREIGN PATENT DOCUMENTS

CN    2431601 Y    5/2001
CN    1484185 A    3/2004
(Continued)

OTHER PUBLICATIONS
International Search Report for PCT/EP2009/007108 mailed Nov. 17, 2009.
(Continued)

*Primary Examiner* — Eric M Blount
(74) *Attorney, Agent, or Firm* — Alston & Bird LLP

(57) ABSTRACT

The invention relates to a tactile man-machine interface comprising an interfacing surface comprising a means for transforming impacts on the interfacing surface into input electrical signals and a data interfacing means, configured for data communication with at least a first and a second device In this configuration, it becomes possible to provide data communication between the first and second devices without having to bring the two devices in contact. Furthermore, the invention relates to a separating element comprising such a tactile man-machine interface and system, such as vending machines, automatic teller machines etc, comprising such a separating element.

16 Claims, 3 Drawing Sheets

(56) References Cited

U.S. PATENT DOCUMENTS

| | | | |
|---|---|---|---|
| 5,541,723 | A | 7/1996 | Tanaka |
| 5,790,114 | A * | 8/1998 | Geaghan et al. .............. 715/763 |
| 6,695,166 | B2 * | 2/2004 | Long ................................ 221/14 |
| 6,747,636 | B2 * | 6/2004 | Martin ........................... 345/178 |
| 6,891,527 | B1 * | 5/2005 | Chapman et al. .............. 345/158 |
| 7,289,113 | B2 * | 10/2007 | Martin ........................... 345/178 |
| 7,345,677 | B2 * | 3/2008 | Ing et al. ........................ 345/173 |
| 7,627,496 | B2 * | 12/2009 | Walker et al. .................... 705/16 |
| 7,639,231 | B2 * | 12/2009 | Parry et al. .................... 345/156 |
| 2005/0174338 | A1 | 8/2005 | Ing et al. |
| 2008/0042999 | A1 * | 2/2008 | Martin ........................... 345/178 |
| 2008/0165137 | A1 * | 7/2008 | Lahade et al. ................. 345/173 |

FOREIGN PATENT DOCUMENTS

| | | |
|---|---|---|
| CN | 1669048 A | 9/2005 |
| WO | WO2007/118076 A | 10/2007 |

OTHER PUBLICATIONS

European Search Report for EP 08 29 0946 dated Mar. 13, 2009.
Chinese Office Action for Application No. 200980139871.9; dated Apr. 11, 2013.
Office Action for Chinese Application No. 200980139871.9 dated Dec. 13, 2013.

\* cited by examiner

US 8,896,429 B2

TACTILE MAN-MACHINE INTERFACE WITH DATA COMMUNICATION INTERFACE

CROSS-REFERENCE TO RELATED APPLICATIONS

The present application is the national phase entry of PCT/EP2009/007108 having international filing date May 10, 2009, which claims priority to European patent application 08290946.6 filed Oct. 7, 2008.

BACKGROUND

The invention relates to a tactile man-machine interface, a separating element comprising a man-machine interface and a method of receiving and transmitting data using such a man-machine interface.

Tactile or touch-sensitive man-machines interfaces are becoming more and more popular with electronic devices such as computer screens or hand-held devices, e.g. mobile telephones. Recent technological advances have made it even possible to render nearly any surface into a tactile man-machine interface. For example, based on the analysis of acoustic signals, surfaces such as of furniture or walls can be turned into tactile man-machine interfaces. In this case, the machine controlled via the tactile man-machine interface, like an electronic device such as a computer etc, can be arranged at a remote location. For example, in a vending machine, such as for selling stamps, newspapers or transportation tickets, the tactile man-machine interface is part of the front part of the machine's housing and the computer controlling the overall vending machine is positioned behind the products at the rear part of the vending machine. Due to the spatial separation between the man-machine interface and the electronic device, it becomes necessary to open the vending machine in case a data transfer with the electronic device becomes necessary, e.g. for maintenance activities.

Starting therefrom, it is the object of the present invention to simplify the data exchange in circumstances like described above.

SUMMARY OF THE INVENTION

This object is achieved with the tactile man-machine interface according to a specific embodiment. The inventive tactile man-machine interface comprises an interfacing surface comprising a means for transforming impacts on the interfacing surface into input electric signals, and a data interfacing means configured to provide data communication with at least a first and second device.

By providing a data interface between the man-machine interface configured to allow data exchange with at least two devices, e.g. an electronic device, like a computer and a second device, it is no longer necessary to carry out data transfer directly between the second device and the first electronic device via a data interface of the electronic device, but by the man-machine interface.

Advantageously, the data interfacing means can be configured to provide data communication for the first and second device, wherein the first and/or second device are remotely arranged. In this case, even if the electronic device is positioned in a remote, inaccessible location, data transfer, like for example for up- or downloading files or for doing maintenance activities, becomes possible without having to reach the electronic device.

Preferably, the data interfacing means is configured to provide wireless data communication with the first and/or second device. In this case, flexibility concerning data transfer between the man-machine interface and the at least two electronic devices is greatly enhanced.

Advantageously, the first and/or second data interface can provide data transmission based on at least one of the standards NFC, RFID, GSM, GPRS, Bluetooth, ZigBee, EDGE, UMTS; HSDPA, Wi-Fi, Wi-Max, WUSB, HSUPA. Thus, any kind of wireless standard can be implemented with the tactile man-machine interface according to the invention to further enhance the flexibility.

According to a preferred embodiment, the data interfacing means can comprise a first data interface and at least one second data interface, wherein the first data interface is configured for data communication with a first electronic device and the second data interface is configured for data communication with a second device, in particular a remote and/or mobile device. By providing dedicated data interfaces for the different devices, one can take into account special requirements, e.g. data security, individually. Thereby the flexibility of the system is enhanced. Preferably, the first and second data interface can be configured such that data can be transmitted from the first to the second data interface and vice versa to allow data transfer between the first and second device.

Preferably, the tactile man-machine can further comprise a processing unit for determining coordinates of the location of an impact on the interfacing surface out of the input electric signals. By doing so the tactile man-machine interface can provide a standardized output and no special hardware or programs need to be provided with the electronic device receiving the localization information. Preferably, the data interfacing means is configured to transmit the coordinates to at least one of the first and second device.

Advantageously, the interfacing surface can be transparent or semitransparent or opaque. In the transparent or semitransparent case, a user of the tactile man-machine interface can receive information from a screen positioned behind the interaction surface or an image projected on the man-machine interface. Using an opaque interfacing surface in combination with the two data interfaces, the man-machine interface according to the invention can also find its application in cases where one does not want a user to have the possibility to look inside the device using the man-machine interface.

Preferably, the means for transforming can comprise at least one piezoelectric transducer attached to the interfacing surface for transferring acoustic signals resulting from impacts on the interfacing surface into corresponding impact electric signals. Nevertheless, the invention is not limited to tactile man-machine interfaces based on the identification of acoustic signals, any technology such as resistive, capacitive, surface acoustic wave, optical or infrared can be used. However, the tactilisation based on acoustic signals has the advantage that any material capable of supporting acoustic waves can be used as interaction surface.

The object of the invention is also achieved with a separating element according to a specific embodiment. The inventive separating element, in particular a wall, a window or door, comprises a tactile man-machine interface as described above. By moving the data interface from the electronic device connected to the man-machine interface towards the man-machine interface itself, it becomes possible to position the electronic device anywhere while at the same time the man-machine interface for the human input but also for data input and output capabilities with respect to a second device can be positioned where needed and independent of the position of the electronic device. For example, a shop window can be turned into a man-machine interface and, using the data interfacing means of the man-machine interface (the shop window), a client can transfer data to the electronic device even after opening hours, like for example digital photos which the client would like to be printed onto paper can be input into the shop's computer.

According to a preferred embodiment, the interfacing surface of the separating element can be an integral part of the separating element. Thus, the interfacing surface and the separating element are preferably made out of one piece. This can, for example, be the shop window or the wood panel of a door or a table etc.

The invention also relates to a system, in particular a vending machine, an automatic teller machine, an electronic information point or an advertising hoarding, comprising a first electronic device and a separating element as described above. With such a system, the same advantages as already described above with respect to the man-machine interface and/or the separating element can be achieved.

Preferably, the system can furthermore comprise a housing and inside the housing the first electronic device, in particular a computer, wherein the housing furthermore comprises the separating element as described above. The data exchange can take place between the outside and the first electronic device positioned inside the system without necessarily having to open the system, as the man-machine interface provides all the necessary data interfaces.

According to a preferred embodiment, the first electronic device can be invisible from outside the housing. Thus, even though one does not see the electronic device and has no access thereto, data exchange between the second device and the first electronic device is still possible.

The invention also relates to a method of receiving and transmitting data, in particular using a man-machine interface or a separating element or a system according to various embodiments, comprising the steps of:
  a) receiving impacts on an interfacing surface and transforming the impacts into input electric signals or coordinates of the location of the impact which have been determined from the input electric signals, via a data interfacing means, and
  b) receiving first input data via the data interfacing means from a first device, and outputting the input data via the data interfacing means to a second device and/or vice versa.

Thus, as already described above in detail, the interface for data transfer between a remote device and a fixed electronic device has been moved from the fixed electronic device to the tactile man-machine interface. This makes the use of these devices more flexible.

Advantageously, the first input data can comprise user identification data and/or firmware data for the means for the transforming and/or the second electronic device and, in particular, is provided by a remotely arranged first device. Providing user identification data allows a personalization of the man-machine interface and by providing firmware data, the maintenance of the above-described system is simplified.

Preferably, the first input data can comprise instructions to modify a graphical user interface of the second device. Thus, for example, using the tactile man-machine interface in a shop window application, it becomes possible to personalize the graphical user interface of a screen (as the second device) positioned inside the shop based on identification data provided by the first device, preferably remote device, which is positioned outside the shop.

Advantageously, the first input data can comprise data to modify internal parameters of the man machine interface.

Thereby it becomes possible to adapt the man-machine interface depending, e.g. on the user's needs using a remote device.

According to another preferably application, the first input data can comprise data to modify interface parameters of the system. Thus from outside the system, e.g. a vending machine, it becomes possible to remotely adapt the interface properties, e.g. the price of a particular product, or the name of a new product.

BRIEF DESCRIPTION OF DRAWINGS

In the following, advantageous embodiments of the invention will be described in detail in relation to the accompanying figures.

DETAILED DESCRIPTION OF SPECIFIC EMBODIMENTS

Figure 1:
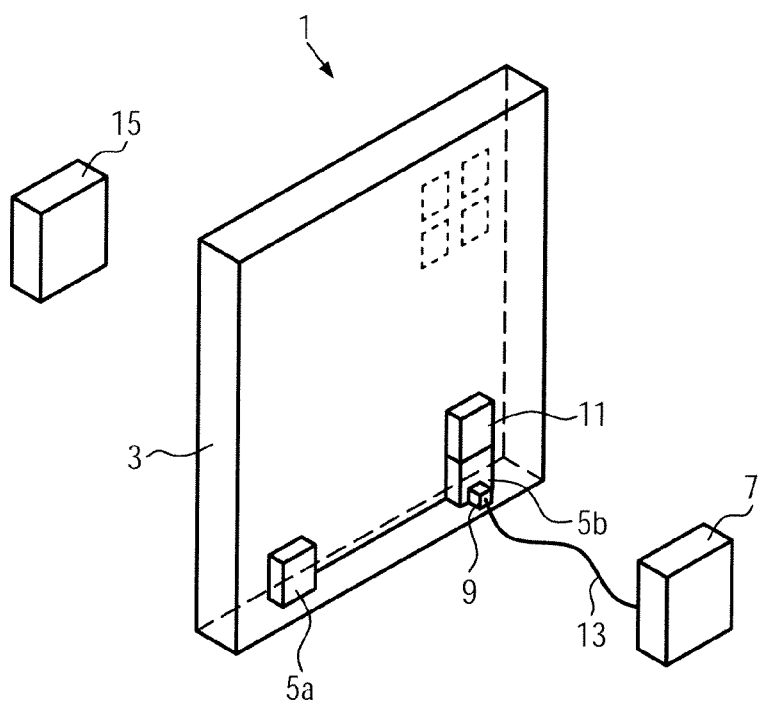
FIG. 1 illustrates a tactile man-machine interface 1 according to a first embodiment of the invention.

FIG. 1 illustrates a tactile man-machine interface 1 according to a first embodiment of the invention. The tactile man-machine interface 1 comprises an interfacing surface 3, for example a glass plate, a plastic plate, a wooden panel, a metal plate, a stone plate, a composite material etc. Instead of a plate, any other shape is also be possible, for example a rounded or bended shapes, like in a car dashboard. The interfacing surface 3 can be transparent, semitransparent or opaque and made out of a rigid or a soft material.

The tactile man-machine interface 1 furthermore comprises means 5a, 5b for transforming impacts on the interfacing surface 3 into input electrical signals. The means for transforming impacts 5a, 5b, thus render the plate the tactile. The technology used to render the surface tactile can be any one, in particular resistive, capacitive, based on surface acoustic waves, optical, infrared etc. In this embodiment, tactilisation is achieved by analysing acoustic waves which arise upon touching the interfacing surface 3. Using transducers, such as piezoelectric sensors which transform acoustic signals into electrical signals, acoustic signals are sensed and then analysed to determine the location (coordinates) of an impact on the interfacing surface 3. The analysis can take place within a processing unit (not shown) linked to the means for transforming 5a, 5b and attached to the back side of the interfacing surface 3 or within an external electronic device 7 not being part of the tactile man-machine interface 1.

In the embodiment illustrated in FIG. 1, two transducers 5a and 5b are used to render the interfacing surface 3 tactile, however, the invention is not limited to this number as, depending on the desired spatial resolution, tactilisation is even possible with only one transducer but also with more than two transducers.

According to the invention, the tactile man-machine interface 1 furthermore comprises a data interfacing means, here in the form of a first data interface 9 and a second data interface 11.

The first data interface 9 in this embodiment is connectable via a cable 13 with the electronic device 7. However, instead of a cable connection 13, also a wireless connection can be provided.

Via the second data interface 11, a data exchange is enabled with a second, external device 15 which is a remote and/or mobile device, like for example a mobile telephone, a PDA, a digital camera, a MP3 player or a device comprising a RFID chip.

In this embodiment, the data communication between the second data interface 11 and the second device 15 is wireless. Instead or in addition, the man-machine interface 1 can also provide a connector based data interface, like a USB connection, to give access to an external device 15. In this case, the second data interface 11 is preferably arranged on the side of the interfacing surface 3 which is turned towards the second device 15.

The first and second data interfaces 9 and 11 are furthermore configured so that any data received from any one of the two interfaces can be transmitted to the other one.

In the case of wireless data transfer, the first and/or second data interfaces 9, 11 can use any one of the protocols NFC, RFID, GSM, GPRS, Bluetooth, ZigBee, EDGE, UMTS; HSDPA, Wi-Fi, Wi-Max, WUSB, HSUPA or any other suitable wireless data transfer protocol.

The inventive tactile man-machine interface 1 according to the first embodiment has the advantage that, even though the electronic device 7 can be positioned such that a direct data exchange between devices 15 and 7 is no longer possible, for example in case electronic device 7 is positioned in an inaccessible and/or shielded room, data exchange between the two devices remains possible via the tactile man-machine interface 1.

In this embodiment, the data interfacing means provides two distinct interfaces 9 and 11, however, according to a variant the data communication could also be provided via only one interface, in particular in the case of a wireless data transfer.

In the following, various possible and advantageous applications of the tactile man-machine interface according to the first embodiment, will be described.

Figure 2:
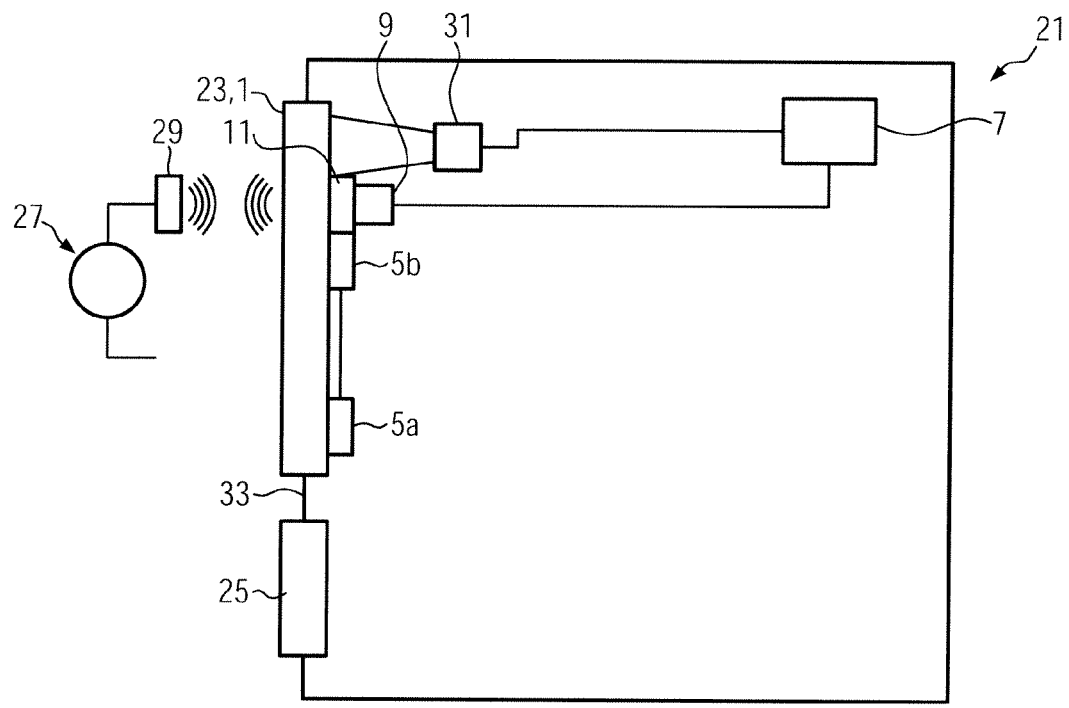
FIG. 2 is a schematic top view of a closed location, like for example a shop with a shop window and a door and which comprises a tactile man-machine interface and represents a first application.

FIG. 2 is a schematic top view of a closed location 21, like for example a shop comprising a shop window 23 and a door 25. The shop window 23 in this embodiment acts as a separating element according to the invention and which is positioned between the inside of the closed location 21 and a user 27 having a hand-held device 29. Device 29 is, for example, a mobile telephone, a PDA, a digital camera, a MP3 player or a device comprising an RFID chip.

The shop window 23, thus the separating element, comprises a tactile man-machine interface 1 like the one illustrated and described in detail with respect to FIG. 1. Features already described with respect to the first embodiment are not described in detail again, but their description is incorporated herewith by referring back to the description of FIG. 1.

In fact, the interacting surface 3 of the tactile man-machine interface 1 illustrated in FIG. 1 here corresponds to the entire shop window 23 and is thus integrally part of the separating element. In this context, "integrally" means made out of one piece. However, also only a part of the show window 23 can play the role of the interacting surface 3.

The means for transforming 5a, 5b, e.g. piezoelectric transducers, are provided on the back side of the shop window 23—the back side with respect to the position of user 27. Like mentioned above, these transducers render the interfacing surface tactile. According to the invention, the shop window 23 is furthermore equipped with the first and second data interface 9, 11 which, in this embodiment, are also attached to the back side of the shop window.

The first data interface 9 is connected with an electronic device 7, here a computer, which in turn is connected with a screen 31 or a beamer device so that the user 27 can read information provided on the screen or projected onto the shop window.

Instead of using the shop window 23 as the tactile man-machine interface, also the door 25 or even the wall 33 could be turned into the interfacing surface.

The system illustrated in FIG. 2 can be used in the following ways:

In the case, that device 29 is an RFID chip comprising identification data concerning the user 27 and that the second data interface 11 is configured to read out the information stored on the RFID chip, the system can recognize the user 27 and it becomes possible to offer him a personalized screen displayed on the display 31 or projected onto the shop window 23.

For example, a shop proposes its entire product catalogue on the display 31. With the shop window 23 being tactilised, the customer can browse through the catalogue by touching the window at predetermined locations on the window 23. In case the user 27 carries an RFID tag which he has received beforehand from the shop, the RFID reader, here data interface 11, receives the recognition data when this customer 27 stands in front of the shop 21 and computer 7 can identify him. Upon identification of the user 27, the display 31 may now display personalized data, for example discounted items or products the user has previously ordered and which can now be fetched. According to a variant, the data provided by the external device 29 comprises instructions to modify the graphical user interface of the display 31 of the second device 7. Thus personalization can not only be achieved out of data stored in computer 7, but directly from the remote device 29.

A second application consists in providing downloading capabilities via the tactile man-machine interface 1. Via the second data interface 11, eventually in addition to the RFID user recognition capabilities, a user 27 can download content from the electronic device 7 positioned inside the shop 12 via the first and second data interface 9, 11 of the tactile man-machine interface 1. The user 27, in this case, would touch a dedicated tactile area on the shop window 23 to activate the downloading, e.g. of photo data, a movie, a catalogue, podcasts etc.

A third application consists in providing an uploading capability. Thus, the second data interface 11, preferably a wireless data interface, allows the user 27 to upload content of his device 29 to the system, in particular to the electronic device 7, via the first and second data interfaces 9 and 11 of the tactile man-machine interface 1. For example, in the case of a photo shop, if the shop is closed, a user 27 can still upload photographs from his digital camera and ask the shop to provide the photographs on paper, wherein the tactile interacting surface 3 can be used for inputting the order (number of photographs, quality etc.).

Figure 3:
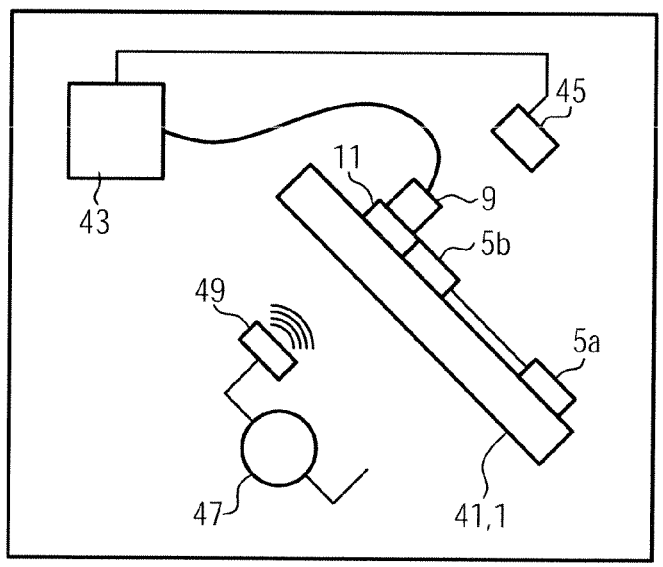
FIG. 3 illustrates a second application of the inventive tactile man-machine interface according to the first embodiment of the invention.

FIG. 3 illustrates a further application of the inventive tactile man-machine interface 1 according to the first embodiment of the invention. FIG. 3 again illustrates a schematic top view with a board 41 comprising the tactile man-machine interface 1 according to the first embodiment of the invention. The features and properties of the man-machine interface 1 are not described in detail again, but their description is incorporated herewith by reference.

Like in the embodiment shown in FIG. 2, the entire board 41 can represent the interaction surface 3 (the interaction surface is integrally part of the board) or only a part of the board. The board 41 is equipped with the means for transforming 5a, 5b and a first and a second data interface 9, 11. Via the first interface 9, the board 41 is in connection with a remotely located first electronic device, such as a computer 43. A screen or beamer 45 in connection with the computer 43 is positioned in the vicinity of the board 41 to display information or project information through the board 41 so that a user 47, positioned on the other side of the board 41, can read this data. Eventually, a beamer could also be positioned on the same side as the user 47 so that the data is projected onto the board 45. According to a further variant, the board 41 itself could also be equipped with a display device.

Like in the embodiment shown in FIGS. 1 and 2, the user 47 now has the possibility to transfer data from his personal hand-held device 49 via the second data interface 11 and the first data interface 9, which are both part of the tactile man-machine interface 1, with the computer 43. The same applications of user recognition, down and upload of data as described above with respect to FIG. 2 can be carried out.

The inventive board 41 can for example be used in a trade fair to provide data to a visitor or it could be an information point providing touristic information about a city and giving a user the possibility to download maps or reserve hotels or it could be a board used in teaching classes, wherein whenever a teacher or student is in front of the board, an RFID chip would identify who is currently working on a given problem.

Figure 4:
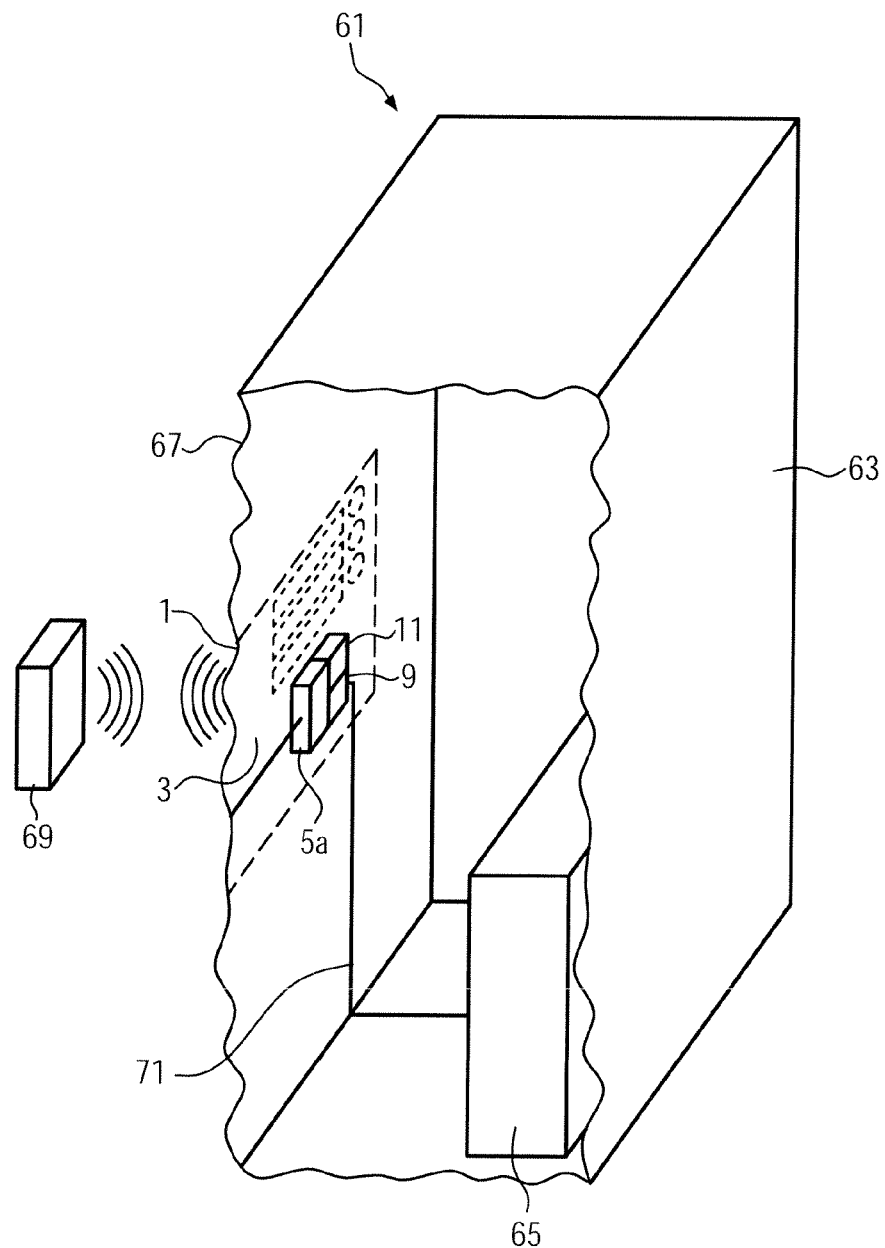
FIG. 4 illustrates a fourth embodiment of the invention and a further application of the inventive tactile man-machine interface 1.

FIG. 4 illustrates a fourth embodiment of the invention and a further application of the inventive tactile man-machine interface 1. FIG. 4 illustrates a 3-dimensional cut view through a system 61, here a vending machine, an automatic teller machine or an electronic information point, which comprises a housing 63, an electronic device 65, such as a computer inside the housing and on one wall 67 of the housing 63, a separating element comprising a tactile man-machine interface 1 according to the first embodiment illustrated in FIG. 1. Again, the features and properties of the tactile man-machine interface 1 as illustrated in FIG. 1 are not described in detail again but the description is incorporated herewith by reference. The interfacing surface 3 in the fourth embodiment is integrally part of the front wall 67 of the housing 63, but could also be a separate element.

Inside the housing 63, e.g. attached to the back side of the front wall 67, the tactile man-machine interface 1 furthermore comprises the means for transforming impacts 5a, 5b and the first and second data interfaces 9, 11. The first data interface 9 is connected via cable 71 with the computer 65 and the second data interface 11 provides wireless data communication capabilities towards a remote device 69 positioned outside of the system 61.

With this system, like a vending machine, the same kind of applications can be carried as already described with respect to the systems described in FIGS. 2 and 3.

In connection with the fourth embodiment, a further advantageous use of the inventive tactile man-machine interface 1 will be described. In fact, using the first and second data interfaces 9, 11, maintenance staff can advantageously carry out maintenance tasks. First of all, using an RFID tag (device 69), the maintenance staff can be recognized by the tactile man-machine interface with or without the assistance of computer 65 and, as a consequence, relevant parameters of system 61 can be automatically downloaded to the maintenance staff's device 69. For example, the serial number, mean correlation rate over the last 100 detections, mean noise level etc, can be provided by computer 65 via the first and second data interfaces 9, 11 of the tactile man-machine interface. Furthermore, in case system 61 provides a screen, specific soft keys or menus can be displayed which are only available for maintenance staff.

As already described above, the user, here the maintenance staff, may not only download content but will also be able to upload data into the system 61. The data transferred between the device 69 and the man-machine interface 1 can comprise, calibration, launching of test programs, log monitoring, a change of button templates, a change of button sizes, activate/deactivate a tactile area, set up parameters concerning sensitivity, contrast, trigger level, user feedback etc or update the software version or the firmware of the electronics used in the man machine interface 1. Thus, the input data provided by the external device 69 comprises data to modify internal parameters of the man machine interface 1 itself. One does not have to proceed via device 65 to carry out this task.

The data interface offered by the tactile man-machine interface 1 can also be used upload data into computer 65, e.g. to update the firmware of system 61, like for example the firmware in computer 65.

In addition, content update of system 61 can be carried out, for example in vending machines, the state of the amount of the stock, prices, any offers or the number of product choices can be updated. If system 61 is used as an advertising hoarding, new advertisements can be added. Thus, the input data provided by the external device 69 comprises data to modify interface parameters of the system 61.

By providing the system 61 with the inventive tactile man-machine interface 1 having at least two data interfaces 9, 11, most of the maintenance tasks of the maintenance staff can be carried out without having to open up the system 61 and without having to access computer 65 which can therefore be freely positioned inside such a machine therefore also giving more freedom for a designer who is in charge of developing such systems.

Having a tactile man-machine interface 1 according to the first embodiment, data can be received and transmitted in the following way: First of all, impacts received on the interfacing surface 3 are transferred by the means of transforming 5a, 5b into input electric signals which can be output via the first data interface towards an electronic device 7, 43 or 65. In addition, first input data can also be received via the second data interface 11 and out via the first data interface 9 towards device 65, 43 or 7. In addition, the tactile man-machine interface 1 can also receive second input data via the first data interface 9 and transmit it via the second data interface 11 to a remote and/or additional mobile device (69, 29, 49 or 15). By doing so, it is no longer necessary to directly bring the two devices in close contact to enable data communication.

The invention claimed is:

1. Tactile man-machine interface comprising:
   a) an interfacing surface comprising a means for transforming impacts on the interfacing surface into input electric signals;
   wherein the means for transforming comprises at least one piezoelectric transducer attached to the interfacing surface for transforming acoustic signals resulting from impacts on the interfacing surface into corresponding impact electric signals, and
   b) a data interfacing means configured to provide data communication with at least a first and second device;
   wherein the data interfacing means comprises a first data interface and at least one second data interface, wherein the first data interface is configured for data communication with a first electronic device and the second data interface is configured for data communication with a second device.

2. Tactile man-machine interface according to claim 1, wherein the data interfacing means is configured to provide data communication for the first and second device, wherein the first and/or second device are remotely arranged.

3. Tactile man-machine interface according to claim 1, wherein the data interfacing means is configured to provide wireless data communication with the first and/or second device.

4. Tactile man-machine interface according to claim 1, further comprising a processing unit for determining coordinates of the location of an impact on the interfacing surface out of the input electric signals.

5. Tactile man-machine interface according to claim 1, wherein the interfacing surface is transparent or semitransparent or opaque.

6. Tactile man-machine interface according to claim 1, wherein the interfacing surface is an integral part of the separating element.

7. Tactile man-machine interface according to claim 6 wherein said tactile man-machine interface comprises one of a vending machine, an automatic teller machine, and an electronic information point.

8. Tactile man-machine interface according to claim 7 further comprising a housing and inside the housing the first electronic device.

9. Tactile man-machine interface according to claim 8, wherein the first electronic device is invisible from outside the housing.

10. Tactile man-machine interface according to claim 9, wherein the first electronic device is invisible from outside the housing.

11. Method of receiving and transmitting data using a tactile man-machine interface comprising the steps of:
  a) receiving impacts on an interfacing surface of the tactile man-machine interface and transforming the impacts into input electric signals and outputting the input electric signals or coordinates of the location of the impact which have been determined from the input electric signals, via a data interfacing means of the tactile man-machine interface, and
  b) receiving first input data via the data interfacing means from a first device, and outputting the input data via the data interfacing means to a second device.

12. Method according to claim 11, wherein the first input data comprises user identification data provided by a remotely arranged first device.

13. Method according to claim 11 wherein the first input data comprises firmware data for at least one of the means for transforming and the second device and-is provided by a remotely arranged first device.

14. Method according to one of claim 11 wherein the first input data comprises instructions to modify a graphical user interface of the second device.

15. Method according to one of claim 11 wherein the first input data comprises data to modify internal parameters of the man machine interface.

16. Method according to one of claim 11 wherein the first input data comprises data to modify interface parameters of the system.

* * * * *

UNITED STATES PATENT AND TRADEMARK OFFICE
CERTIFICATE OF CORRECTION

| | | |
|---|---|---|
| PATENT NO. | : 8,896,429 B2 | Page 1 of 1 |
| APPLICATION NO. | : 13/122405 | |
| DATED | : November 25, 2014 | |
| INVENTOR(S) | : Chaine | |

It is certified that error appears in the above-identified patent and that said Letters Patent is hereby corrected as shown below:

In the claims:

Column 10,
Line 19, "and-is" should read --and is--;
Lines 21, 24 and 27, "one of claim 11" should read --claim 11--.

Signed and Sealed this
Twenty-eighth Day of July, 2015

Michelle K. Lee
*Director of the United States Patent and Trademark Office*